United States Patent [19]

Jackson

[11] Patent Number: 4,859,391
[45] Date of Patent: Aug. 22, 1989

[54] METHOD OF MAKING A SMOOTH FLEXIBLE FLANGE COVER

[75] Inventor: Norman C. Jackson, Livonia, Mich.

[73] Assignee: The Standard Products Company, Cleveland, Ohio

[21] Appl. No.: 189,656

[22] Filed: May 3, 1988

[51] Int. Cl.⁴ .................. B29C 47/02; B32B 31/12; B32B 31/30
[52] U.S. Cl. .................. 264/162; 29/527.4; 264/172; 264/177.2; 264/210.2; 264/295
[58] Field of Search ............ 264/162, 172, 173, 177.1, 264/177.17, 177.2, 209.1, 210.2, 210.6, 211.12, 229, 295, 339; 29/527.1, 527.2, 527.4; 49/462, 490; 52/208, 716; 428/122, 188, 358

[56] References Cited

U.S. PATENT DOCUMENTS

| | | | |
|---|---|---|---|
| 3,067,455 | 12/1962 | Reid | 264/171 X |
| 3,934,385 | 1/1976 | Paulus et al. | 52/716 X |
| 4,188,765 | 2/1980 | Jackson | 52/716 |
| 4,271,634 | 6/1981 | Andrzejewski | 52/716 X |
| 4,296,062 | 10/1981 | Gauchel et al. | 264/173 |
| 4,347,693 | 9/1982 | Kruschwitz | 52/208 |
| 4,381,273 | 4/1983 | Azzola | 264/162 X |
| 4,472,469 | 9/1984 | Thies | 428/122 |
| 4,513,044 | 4/1985 | Shigeki et al. | 428/122 |
| 4,581,807 | 4/1986 | Adell | 29/527.4 |
| 4,676,856 | 6/1987 | Shigeki et al. | 428/122 X |

Primary Examiner—Jeffery Thurlow
Assistant Examiner—Leo B. Tentoni
Attorney, Agent, or Firm—Harness, Dickey & Pierce

[57] ABSTRACT

A molding for attachment to a vehicle includes a core member having a plurality of longitudinally spaced clip members and apertures between the clip members. An outer layer is extruded about the core member. The core member is formed to a predetermined configuration and presents an outer surface having ridges corresponding to clip members and valleys corresponding to the apertures. A cover layer covers the outer layer to fill the valleys to form a smooth continuous planar outer surface.

7 Claims, 1 Drawing Sheet

U.S. Patent   Aug. 22, 1989   4,859,391
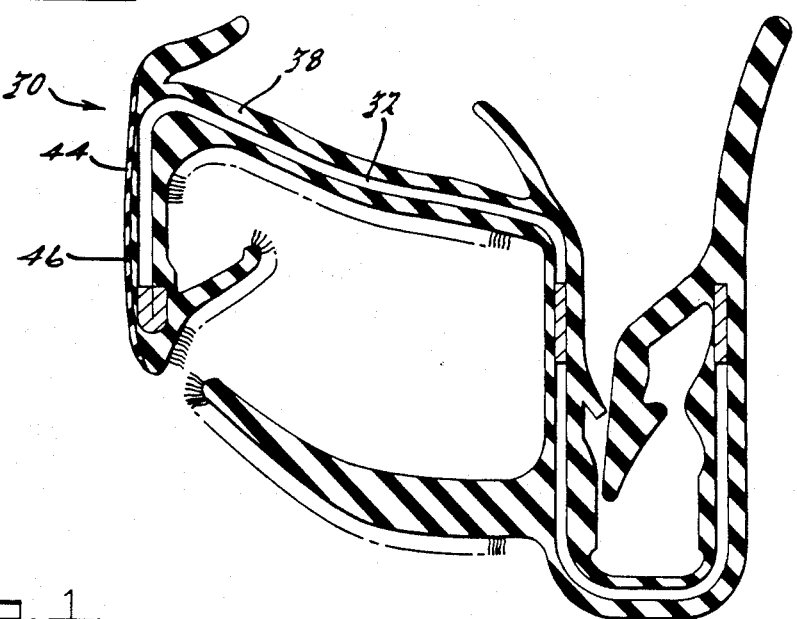
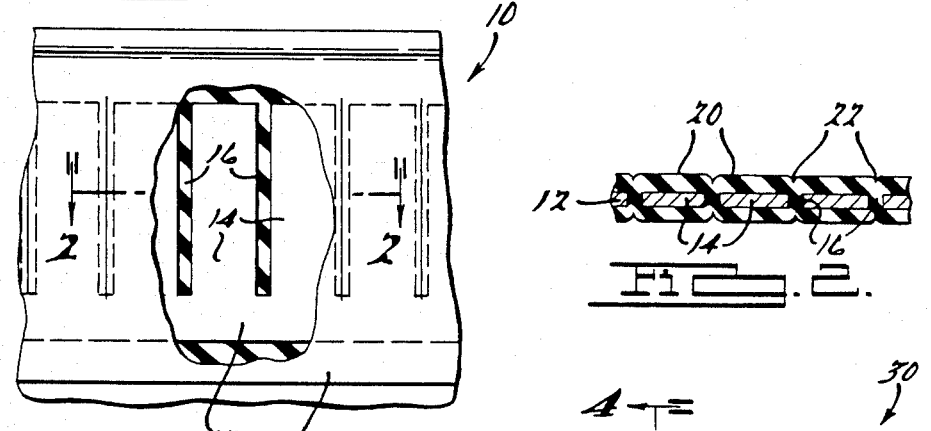
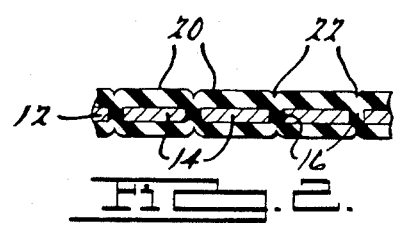
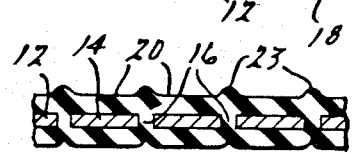
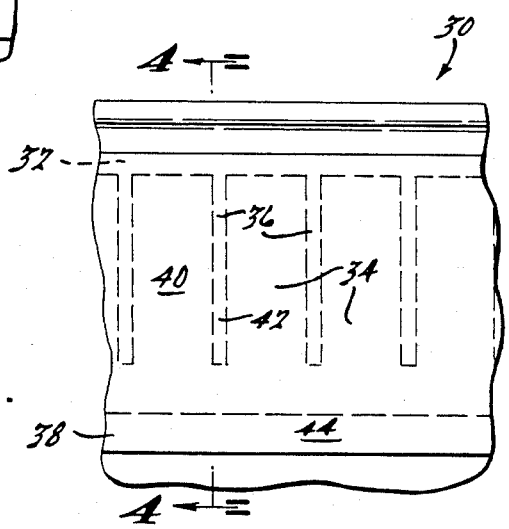

METHOD OF MAKING A SMOOTH FLEXIBLE FLANGE COVER

BACKGROUND OF THE INVENTION

The present invention relates to flange or edge covers. More particularly, the present invention relates to glass run channels adapted for attachment to an automotive vehicle by means of flange or edge covers.

Glass run channels with flange finishers are used in the manufacture of automotive vehicles. One method of fabricating such glass run channels uses a metal core in the form of a strip which is slotted to form a plurality of longitudinally spaced members with apertures therebetween. An elastomeric material is extruded about the metal core which is then processed into a predetermined configuration such as into a U-shape. Often the elastomeric material sinks or falls in the apertures between the individual spaced metal members. This presents an outer surface having a series of ridges corresponding to the members and valleys corresponding to the apertures. This is commonly referred to as the "hungry horse" effect or appearance. The aesthetic appearance of a flange cover exhibiting the hungry horse effect is not desirable since it does not provide a smooth continuous planar outer surface.

SUMMARY OF THE INVENTION

A flange cover for attachment to a vehicle includes a core member comprising a plurality of longitudinally spaced clip members. A first elastomeric layer is disposed about the core member. A second elastomeric layer covers the first elastomeric layer to form a smooth continuous planar surface.

The flange cover is made by the method of first forming a core member having a plurality of longitudinally spaced clip members with a plurality of apertures between the clip members; then extruding a first layer of elastomeric material to encapsulate the core member; forming the core member and outer layer to a predetermined configuration thereby forming an outer surface having ridges and valleys; grinding the ridges of the outer layer to a height less than their original height; and extruding an elastomeric cover layer over the ground outer layer to form a substantially smooth outer surface.

Accordingly, the subject invention presents a relatively smooth continuous planar outer surface. This improves the aesthetic appearance while eliminating the hungry horse effect. Other advantages of the present invention will be readily appreciated as the same becomes better understood by reference to the following detailed description when considered in connection with the accompanying drawings.

p BRIEF DESCRIPTION OF THE DRAWINGS

FIG. 1 is a plan view partially broken away, of a conventional flange cover with glass run channel having a hungry horse effect.

FIG. 2 is a cross-sectional view, broken away, of the conventional molding of FIG. 1 showing the hungry horse effect.

FIG. 3 is a plan view of a preferred embodiment of a flange cover with glass run channel of the subject invention.

FIG. 4 is a cross-sectional view of the preferred embodiment of the subject invention taken along line 4—4 of FIG. 3.

FIG. 5 is a cross-sectional view, broken away, of a conventional flange cover showing an alternative hungry horse effect.

DESCRIPTION OF THE INVENTION

A conventional flange cover for attachment to a vehicle (not shown) is generally shown at 10 in FIG. 1. The cover 10 includes a core member 12 having a plurality of longitudinally spaced clip members 14. As best shown in FIG. 2, core member 12 includes apertures 16 formed between the clip members 14. An outer layer 18 of elastomeric material is disposed about the core member 12. The core member 12 is bent to a predetermined configuration such as an 'S' shape. The outer layer 18 presents an outer surface 20 having valleys 22 corresponding to the apertures 16 between clip members 14. As illustrated in FIG. 2, the molding has a 'hungry horse' appearance.

As shown in FIG. 5, a hungry horse effect can also occur in an alternative way during forming of cover 12. As shown in FIG. 5 outer surface 20 has ridges 23 instead of valleys corresponding to the apertures 16 between clip members 14. Ridges 23 can occur, for example, when there is more pressure on one side of the core than the other during extrusion of elastomeric material.

In contrast to the above "hungry horse" flange covers, a flexible flange cover of the subject invention is generally shown at 30 in FIG. 3. The molding 30 includes a core member 32 having a plurality of longitudinally spaced clip members 34. Clip members 34 are spaced apart, thereby having apertures 36 therebetween. Flange cover 30 includes an outer layer 38 disposed about the core member 32. The core member 32 is formed by bending to a predetermined configuration, such as the "S" shape shown in FIG. 4.

During processing valleys may occur at 42. However, in accordance with the method of the present invention, a smooth outer surface is provided by covering the outer layer 38 at surface portion 46 with a cover layer 44 of elastomeric material which fills the valleys 44 and forms a smooth continuous planar outer surface 40. Cover layer 44 can be comprised of, for example, polypropylene or polyethylene. Cover layer 44 has a thickness greater than the depth of the valleys 44. Thus, the 'hungry horse' appearance is eliminated.

Accordingly, a method is provided of making a flange cover for attachment to a vehicle flange including the steps of forming a core member 32 having a plurality of longitudinally spaced clip members 34 with a plurality of apertures 36 between the clip members 34; extruding an outer layer 38 of elastomeric material about the core member 32; optionally grinding the outer layer 38 to reduce the height of any ridges thereon and extruding a cover layer 44 over the outer layer to form a smooth continuous planar outer surface 40.

Obviously, many modifications and variations of the present invention are possible in light of the disclosure of a preferred embodiment of the present invention. It is, therefore, to be understood that within the scope of the appended claims, the invention may be practiced otherwise than as specifically described.

What is claimed is:

1. A method of making a flange cover for attachment to a vehicle, said method comprising the steps of:

forming a core member having a plurality of longitudinally spaced clip members and a plurality of apertures between said clip members;

extruding an outer layer of elastomeric material about the core member;

bending the core member and outer layer and forming the core member and outer layer to a predetermined configuration, whereby the outer surface has ridges corresponding to said clip members and valleys corresponding to the apertures;

grinding the ridges of at least a portion of the outer layer to a height less than their original height; and extruding a cover layer about the ground portion and forming a smooth continuous planar outer surface.

2. A method as set forth in claim 1 characterized by extruding the cover layer from a polymeric material.

3. A method as set forth in claim 2 further characterized by extruding the cover layer with a thickness greater than the depth of the valleys.

4. A method as set forth in claim 3 further characterized by extruding the outer layer from an elastomeric material.

5. A method as set forth in claim 1 further characterized by extruding the cover layer from a polyethylene material.

6. A method as set forth in claim 1 further characterized by extruding the cover layer from a polypropylene material.

7. A method of making a flange cover for attachment to a vehicle, said method comprising the steps of:

forming a core member having a plurality of longitudinally spaced clip members and a plurality of apertures between said clip members;

extruding an outer layer of elastomeric material about the core member; bending the core member and outer layer and forming an outer surface on the outer layer having ridges corresponding to the clip members and valleys corresponding to the apertures;

grinding the ridges to a height less than their original height; and extruding a cover layer of a polymeric material about the ground ridges and forming a smooth continuous planar outer surface.

* * * * *